United States Patent
Wei et al.

(10) Patent No.: US 10,616,403 B2
(45) Date of Patent: Apr. 7, 2020

(54) VOICE QUALITY ASSESSMENT METHOD AND APPARATUS

(71) Applicant: HUAWEI TECHNOLOGIES CO., LTD., Shenzhen, Guangdong (CN)

(72) Inventors: Yuejun Wei, Shanghai (CN); Xin Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 15/835,821

(22) Filed: Dec. 8, 2017

(65) Prior Publication Data
US 2018/0103143 A1 Apr. 12, 2018

Related U.S. Application Data

(63) Continuation of application No. PCT/CN2016/082628, filed on May 19, 2016.

(30) Foreign Application Priority Data

Jun. 18, 2015 (CN) .......................... 2015 1 0342139

(51) Int. Cl.
*H04M 3/22* (2006.01)
*H04W 24/08* (2009.01)
(Continued)

(52) U.S. Cl.
CPC ...... *H04M 3/2236* (2013.01); *H04L 43/0847* (2013.01); *H04L 65/80* (2013.01);
(Continued)

(58) Field of Classification Search
CPC ... H04M 3/2236; H04W 24/10; H04W 24/08; H04W 24/02; H04L 65/80; H04L 43/0847
See application file for complete search history.

(56) References Cited

U.S. PATENT DOCUMENTS 10,103,999 B2 * 10/2018 Huo ...................... H04J 3/0632
10,104,225 B2 * 10/2018 Zhang ................. H04M 3/2227
(Continued)

FOREIGN PATENT DOCUMENTS

| CN | 102143524 A | 8/2011 |
|---|---|---|
| CN | 103053193 A | 4/2013 |

(Continued)

OTHER PUBLICATIONS

Chinese Office Action issued in Chinese Application No. 201510342139.9 dated Jan. 2, 2019, 9 pages.
(Continued)

*Primary Examiner* — Mounir Moutaouakil
(74) *Attorney, Agent, or Firm* — Fish & Richardson P.C.

(57) ABSTRACT

Embodiments of the present invention disclose a voice quality assessment method and apparatus. The method includes: obtaining a first transmission error code parameter and a second transmission error code parameter, where the first transmission error code parameter is a transmission error code parameter of an uplink channel of first user equipment, and the second transmission error code parameter is a transmission error code parameter of a downlink channel of second user equipment; and generating an end-to-end voice quality index between the first user equipment and the second user equipment according to the first transmission error code parameter and the second transmission error code parameter.

9 Claims, 2 Drawing Sheets

---

Receive a transmission error code parameter obtaining request sent by a target node — 201

↓

Obtain a first transmission error code parameter of first user equipment, where the first user equipment and a parameter type of the first transmission error code parameter are designated in the transmission error code parameter obtaining request — 202

↓

Send the first transmission error code parameter to the target node, so that after obtaining a second transmission error code parameter of second user equipment, the target node calculates an end-to-end voice quality index between the designated user equipment and another user equipment according to the first transmission error code parameter and the second transmission error code parameter — 203

(51) Int. Cl.
*H04L 12/26* (2006.01)
*H04L 29/06* (2006.01)
*H04W 24/10* (2009.01)
*H04W 24/02* (2009.01)

(52) U.S. Cl.
CPC ........... *H04W 24/08* (2013.01); *H04W 24/10* (2013.01); *H04W 24/02* (2013.01)

(56) References Cited

U.S. PATENT DOCUMENTS

| | | | |
|---|---|---|---|
| 2006/0262803 | A1 | 11/2006 | Lee et al. |
| 2008/0175228 | A1* | 7/2008 | Chang ................. H04M 3/2236 370/352 |
| 2010/0322145 | A1* | 12/2010 | Yu .......................... H04B 7/155 370/315 |
| 2013/0143602 | A1 | 6/2013 | Rodriguez et al. |
| 2013/0286860 | A1 | 10/2013 | Dorenbosch et al. |
| 2014/0256310 | A1 | 9/2014 | Wang et al. |
| 2017/0104867 | A1* | 4/2017 | Kim ..................... H04M 3/2236 |

FOREIGN PATENT DOCUMENTS

| | | |
|---|---|---|
| CN | 103138963 A | 6/2013 |
| CN | 103338471 A | 10/2013 |
| CN | 103402219 A | 11/2013 |
| CN | 103874159 A | 6/2014 |
| KR | 20070095032 A | 9/2007 |

OTHER PUBLICATIONS

Stefan Wänstedt et al.,"Development of an objective speech quality measurement model for the AMR codec",2002, total 6 pages.
ITU-T P.800(08/96),Series P:Telephone Transmission Quality, Methods for objective and subjective assessment of quality,Methods for subjective determination of transmission quality,total 37 pages.
ITU-T P.862 Corrigendum 1(Oct. 2007),Perceptual evaluation of speech quality (PESQ):An objective method for end-to-end speech quality assessment of narrow-band telephone networks and speech codecs;Corrigendum 1,total 8 pages.
ITU-T P.830 Implementer's Guide(Mar. 28, 2013),Implementer's Guide for P.830 (Subjective performance assessment of telephone-band and wideband digital codecs),total 3 pages.
International Search Report in International Application No. PCT/CN2016/082628, dated Aug. 26, 2016, 7 pages.
ETSI TS 123 207 V12.0.0 (Sep. 2014),Digital cellular telecommunications system (Phase 2+);Universal Mobile Telecommunications System (UMTS);LTE;End-to-end Quality of Service (QoS) concept and architecture(3GPP TS 23.207 version 12.0.0 Release 12),total 41 pages.
Extended European Search Report issued in European Application No. 16810879.3 dated Apr. 23, 2018, 9 pages.
European Communication Pursuant to Article 94(3) EPC issued in European Application No. 16810879.3 dated Feb. 13, 2019, 5 pages.

* cited by examiner

VOICE QUALITY ASSESSMENT METHOD AND APPARATUS

CROSS-REFERENCE TO RELATED APPLICATIONS

This application is a continuation of International Application No. PCT/CN2016/082628, filed on May 19, 2016, which claims priority to Chinese Patent Application No. 201510342139.9, filed on Jun. 18, 2015. The disclosures of the aforementioned applications are hereby incorporated by reference in its entirety.

TECHNICAL FIELD

The present invention relates to the field of mobile communications, and in particular, to a voice quality assessment method and apparatus.

BACKGROUND

In wireless communications technologies, voice call quality is an important index for measuring performance of a wireless communications system. Therefore, accurate and effective voice quality assessment provides a positive guidance for construction and optimization of the wireless communications system. In the existing various voice quality assessment methods, voice quality assessment gradually becomes a most frequently used voice quality assessment method due to such advantages as high test efficiency and an accurate test result.

When voice quality assessment is performed on a wireless communications system by using an on-line assessment method, an access node such as a base station (BS) may obtain transmission error code parameters between the access node and user equipment (UE), such as a bit error rate (BER), a block error rate (BLER), and a longest consecutive frame error (LFE), use the parameters as inputs, and calculate a voice quality index between the access node and the user equipment by using a pre-established voice quality index (VQI) calculation model.

After a research on the prior art, it is found that only a VQI between user equipment and an access node can be calculated by using the existing voice quality assessment method, to assess voice quality between the user equipment and the access node, but a requirement on end-to-end voice quality assessment between different user equipments cannot be satisfied.

SUMMARY

Embodiments of the present invention provide a voice quality assessment method and apparatus, to satisfy a requirement on end-to-end voice quality assessment between different user equipments.

According to a first aspect, an embodiment of the present invention provides a voice quality assessment method, where the method includes: obtaining a first transmission error code parameter and a second transmission error code parameter, where the first transmission error code parameter is a transmission error code parameter of an uplink channel of first user equipment, and the second transmission error code parameter is a transmission error code parameter of a downlink channel of second user equipment; and generating an end-to-end voice quality index between the first user equipment and the second user equipment according to the first transmission error code parameter and the second transmission error code parameter.

With reference to the first aspect, in a first possible implementation of the first aspect, the obtaining a first transmission error code parameter of an uplink channel of first user equipment and a second transmission error code parameter of a downlink channel of second user equipment includes: determining a first access node accessed by the first user equipment and a second access node accessed by the second user equipment; obtaining the first transmission error code parameter from the first access node; and obtaining the second transmission error code parameter from the second access node.

With reference to the first aspect or the first possible implementation of the first aspect, in a second possible implementation of the first aspect, the generating an end-to-end voice quality index between the first user equipment and the second user equipment includes: when both a parameter type of the first transmission error code parameter and a parameter type of the second transmission error code parameter are pre-determined types, generating an end-to-end transmission error code parameter between the first user equipment and the second user equipment according to the first transmission error code parameter and the second transmission error code parameter; and calculating the end-to-end voice quality index corresponding to the end-to-end transmission error code parameter by using a preset voice quality index calculation model.

With reference to the first aspect or the first possible implementation of the first aspect, in a third possible implementation of the first aspect, the generating an end-to-end voice quality index between the first user equipment and the second user equipment includes: determining a parameter type of the first transmission error code parameter and a parameter type of the second transmission error code parameter; selecting a current voice quality index calculation model corresponding to the parameter types from a candidate voice quality index calculation model; and calculating the end-to-end voice quality index corresponding to the end-to-end error code parameter by using the current voice quality index calculation model.

According to a second aspect, an embodiment of the present invention further provides another voice quality assessment method, where the method includes: receiving a transmission error code parameter obtaining request sent by a target node; obtaining a first transmission error code parameter of first user equipment, where the first user equipment and a parameter type of the first transmission error code parameter are designated in the transmission error code parameter obtaining request; and sending the first transmission error code parameter to the target node, so that after obtaining a second transmission error code parameter of second user equipment, the target node calculates an end-to-end voice quality index between the designated user equipment and another user equipment according to the first transmission error code parameter and the second transmission error code parameter.

With reference to the second aspect, in a first possible implementation of the second aspect, the first transmission error code parameter is a transmission error code parameter of an uplink channel of the first user equipment, and the second transmission error code parameter is a transmission error code parameter of a downlink channel of the second user equipment.

With reference to the second aspect, in a second possible implementation of the second aspect, the first transmission error code parameter is a transmission error code parameter of a downlink channel of the first user equipment, and the second transmission error code parameter is a transmission error code parameter of an uplink channel of the second user equipment.

According to a third aspect, an embodiment of the present invention provides a voice quality assessment apparatus, where the apparatus includes: an obtaining unit, configured to obtain a first transmission error code parameter and a second transmission error code parameter, where the first transmission error code parameter is a transmission error code parameter of an uplink channel of first user equipment, and the second transmission error code parameter is a transmission error code parameter of a downlink channel of second user equipment; and a generation unit, configured to generate an end-to-end voice quality index between the first user equipment and the second user equipment according to the first transmission error code parameter and the second transmission error code parameter.

With reference to the third aspect, in a first possible implementation of the third aspect, the obtaining unit includes: an access node determining subunit, configured to determine a first access node accessed by the first user equipment and a second access node accessed by the second user equipment; a first parameter obtaining subunit, configured to obtain the first transmission error code parameter from the first access node; and a second parameter obtaining subunit, configured to obtain the second transmission error code parameter from the second access node.

With reference to the third aspect or the first possible implementation of the third aspect, in a second possible implementation of the third aspect, the generation unit includes: a parameter generation subunit, configured to: when both a parameter type of the first transmission error code parameter and a parameter type of the second transmission error code parameter are pre-determined types, generate an end-to-end transmission error code parameter between the first user equipment and the second user equipment according to the first transmission error code parameter and the second transmission error code parameter; and a first index calculation subunit, configured to calculate the end-to-end voice quality index corresponding to the end-to-end error code parameter by using a preset voice quality index calculation model.

With reference to the third aspect or the first possible implementation of the third aspect, in a third possible implementation of the third aspect, the generation unit includes: a parameter type determining subunit, configured to determine a parameter type of the first transmission error code parameter and a parameter type of the second transmission error code parameter; a calculation model selection subunit, configured to select a current voice quality index calculation model corresponding to the parameter types from a candidate voice quality index calculation model; and a second index calculation subunit, configured to calculate the end-to-end voice quality index corresponding to the end-to-end error code parameter by using the current voice quality index calculation model.

According to a fourth aspect, an embodiment of the present invention further provides another voice quality assessment apparatus, where the apparatus includes: a receiving unit, configured to receive a transmission error code parameter obtaining request sent by a target node; an obtaining unit, configured to obtain a first transmission error code parameter of first user equipment, where the first user equipment and a parameter type of the first transmission error code parameter are designated in the transmission error code parameter obtaining request; and a sending unit, configured to send the first transmission error code parameter to the target node, so that after obtaining a second transmission error code parameter of second user equipment, the target node calculates an end-to-end voice quality index between the designated user equipment and another user equipment according to the first transmission error code parameter and the second transmission error code parameter.

With reference to the fourth aspect, in a second possible implementation of the fourth aspect, the first transmission error code parameter is a transmission error code parameter of an uplink channel of the first user equipment, and the second transmission error code parameter is a transmission error code parameter of a downlink channel of the second user equipment.

With reference to the fourth aspect, in a second possible implementation of the fourth aspect, the first transmission error code parameter is a transmission error code parameter of a downlink channel of the first user equipment, and the second transmission error code parameter is a transmission error code parameter of an uplink channel of the second user equipment.

According to a fifth aspect, an embodiment of the present invention provides a network node, where the network node includes a processor and a communications unit, where the communications unit is configured to obtain a first transmission error code parameter and a second transmission error code parameter, where the first transmission error code parameter is a transmission error code parameter of an uplink channel of first user equipment, and the second transmission error code parameter is a transmission error code parameter of a downlink channel of second user equipment; and the processor is configured to generate an end-to-end voice quality index between the first user equipment and the second user equipment according to the first transmission error code parameter and the second transmission error code parameter.

According to a sixth aspect, an embodiment of the present invention provides an access node, where the access node includes a processor and a communications unit, where the communications unit is configured to receive a transmission error code parameter obtaining request sent by a target node; the processor is configured to obtain a first transmission error code parameter of first user equipment, where the first user equipment and a parameter type of the first transmission error code parameter are designated in the transmission error code parameter obtaining request; and the communications unit is further configured to send the first transmission error code parameter to the target node, so that after obtaining a second transmission error code parameter of second user equipment, the target node calculates an end-to-end voice quality index between the designated user equipment and another user equipment according to the first transmission error code parameter and the second transmission error code parameter.

In the embodiments of the present invention, a first transmission error code parameter and a second transmission error code parameter are obtained, where the first transmission error code parameter is a transmission error code parameter of an uplink channel of first user equipment, and the second transmission error code parameter is a transmission error code parameter of a downlink channel of second user equipment; and an end-to-end voice quality index between the first user equipment and the second user equipment is generated according to the first transmission error code parameter and the second transmission error code parameter. By means of the method and the apparatus in the embodiments of the present invention, a network node can calculate an end-to-end VQI between different user equipments, so as to assess end-to-end voice quality by using the end-to-end VQI and satisfy a requirement on end-to-end voice quality assessment between the different user equipments.

BRIEF DESCRIPTION OF DRAWINGS

To describe the technical solutions in the embodiments of the present invention more clearly, the following briefly describes the accompanying drawings required for describing the embodiments. Apparently, a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, a network node is a service device in a wireless communications system, and may include such nodes as a base station (BS), a radio network controller (RNC), and a core network. An access node is some network nodes that are configured to implement accessing of user equipment and may be, for example, a service device such as a base station and a radio network controller that are configured to implement accessing of user equipment.

Figure 1:
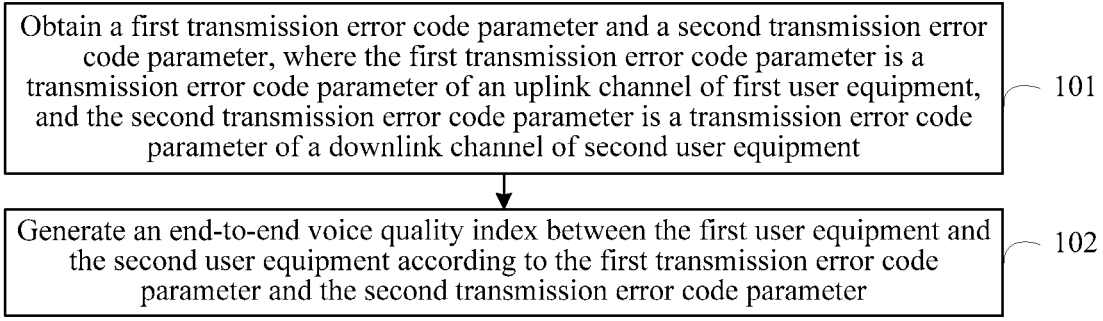
FIG. 1 is a flowchart of an embodiment of a voice quality assessment method according to the present invention.

Referring to FIG. 1, FIG. 1 is a flowchart of an embodiment of a voice quality assessment method according to the present invention. The method in this embodiment may be performed by a network node in a wireless communications system. As shown in the FIG. 1, the method includes the following steps.

Step 101: Obtain a first transmission error code parameter and a second transmission error code parameter, where the first transmission error code parameter is a transmission error code parameter of an uplink channel of first user equipment, and the second transmission error code parameter is a transmission error code parameter of a downlink channel of second user equipment.

Because a transmission error code parameter of user equipment needs to be obtained from an access node accessed by the user equipment, when obtaining the first transmission error code parameter and the second transmission error code parameter, the network node needs to first determine a first access node accessed by the first user equipment and a second access node accessed by the second user equipment. After determining the first access node and the second access node, the network node may obtain the first transmission error code parameter from the first access node; and obtain the second transmission error code parameter from the second access node. During actual application, the first access node and the second access node may be a same access node or different access nodes.

For example, when the first user equipment accesses a first base station and the second user equipment accesses a second base station, the network node may obtain the first transmission error code parameter from the first access node and obtain the second transmission error code parameter from the second access node. Specifically, if the network node is a core network, the network node may obtain the first transmission error code parameter from the first base station and obtain the second transmission error code parameter from the second base station. If the network node is the first base station, the network node may obtain the first transmission error code parameter from the network node and obtain the second transmission error code parameter from the second base station. If the network node is the second base station, the network node may obtain the second transmission error code parameter from the network node and obtain the first transmission error code parameter from the first base station.

For another example, when both the first user equipment and the second user equipment access a third base station, the network node may directly obtain the first transmission error code parameter and the second transmission error code parameter from the third base station. Specifically, if the network node is the third base station, the network node may directly obtain the first transmission error code parameter and the second transmission error code parameter from the network node. If the network node is a core network, the network node may obtain the first transmission error code parameter and the second transmission error code parameter from the third base station.

It should be noted herein that because there are various types of transmission error code parameters and different network nodes may provide different types of error code parameters, for ease of completing voice quality assessment, a parameter type of the first transmission error code parameter and a parameter type of the second transmission error code parameter may be types that are preset in a system, or may be types that can be provided by a base station. In general cases, the first transmission error code parameter and the second transmission error code parameter have a same parameter type, or there is a predetermined conversion relationship between parameters types of the first transmission error code parameter and the second transmission error code parameter. For example, when the access node is a base station, the base station may provide an error code parameter such as a BER, a BLER, or an LFE. Therefore, the parameter type of the first transmission error code parameter and the parameter type of the second transmission error code parameter may be preset to one or more of the BER, the BLER, or the LFE.

Step 102: Generate an end-to-end voice quality index between the first user equipment and the second user equipment according to the first transmission error code parameter and the second transmission error code parameter.

When both the parameter type of the first transmission error code parameter and the parameter type of the second transmission error code parameter are parameter types that are preset in the system, after obtaining the first transmission error code parameter and the second transmission error code parameter, the network node may calculate an end-to-end transmission error code parameter between the first user equipment and the second user equipment according to the first transmission error code parameter and the second transmission error code parameter; and calculate the end-to-end voice quality index corresponding to the end-to-end error code parameter by using a preset voice quality index calculation model.

The end-to-end transmission error code parameter may be a sum of the first transmission error code parameter and the second transmission error code parameter, or may be a sum of a product of the first transmission error code parameter and a first weight value and a product of the second transmission error code parameter and a second weight value. The preset voice quality index calculation model may be a voice quality index calculation model in the prior art.

For example, when the first transmission error code parameter includes a first BLER, a first BER, and a first LFE of the uplink channel of the first user equipment, the second transmission error code parameter includes a second BLER, a second BER, and a second LFE of the downlink channel of the second user equipment, and the preset voice quality index calculation model is $YQI=A*BER^a+B*BLER^b+C*LFE^c+Const$, the network node may first calculate the end-to-end transmission error code parameter between the first user equipment and the second user equipment: a third BLER, a third BER, and a third LFE. The third BLER may be a sum of the first BLER and the second BLER, the third BER may be a sum of the first BER and the second BER, and the third LFE may be a sum of the first LFE and the third LFE. After the third BLER, the third BER, and the third LFE are calculated, the third BLER, the third BER, and the third LFE may be substituted to the calculation model, so as to calculate an end-to-end voice quality index between the first base station and the second base station. A, B, C, a, b, and Const are parameters related to source coding.

During application, because the user equipment has diversified parameter types in use and different user equipments use different access methods to access the access node, when the network node obtains the first transmission error code parameter, the network node may obtain different types of transmission error code parameters from different access nodes. To ensure that the network node (such as a core network) can calculate end-to-end voice quality indexes between all different user equipments, after obtaining the first transmission error code parameter and the second transmission error code parameter, the network node may determine the parameter type of the first transmission error code parameter and the parameter type of the second transmission error code parameter; select a current voice quality index calculation model corresponding to the parameter types from a candidate voice quality index calculation model; and calculate the end-to-end voice quality index corresponding to the end-to-end error code parameter by using the current voice quality index calculation model. The candidate voice quality index calculation model is obtained by means of conversion from an available voice quality index calculation model in the prior art, or may be constructed by a person skilled in the art according to a status of a wireless communications system.

For example, after determining that the first transmission error code parameter includes the first BLER, the first BER, and the first LFE of the uplink channel of the first user equipment, and the second transmission error code parameter includes the second BLER, the second BER, and the second LFE of the downlink channel of the second user equipment, the network node may select the current voice quality index calculation model from the candidate voice quality index calculation model when the parameter type of the transmission error code parameter includes a BLER, a BER, and an LFE. For example, the current voice quality index calculation model may be $VQI=A*(BER_1+BER_2)^a+B*(BLER_1+BLER_2)^b+C*(LFE_1+LFE_2)^c+Const$. $BER_1$ is the first BER, $BER_2$ is the second BER, $BLER_1$ is the first BLER, $BLER_2$ is the second BLER, $LFE_1$ is the first LFE, and $LFE_2$ is the second LFE, and A, B, C, a, b, c, and Const are parameters related to source coding. The current voice quality index calculation model is obtained by means of conversion from an available voice quality index calculation model in the prior art.

In this embodiment, a network node may obtain a first transmission error code parameter and a second transmission error code parameter, where the first transmission error code parameter is a transmission error code parameter of an uplink channel of first user equipment, and the second transmission error code parameter is a transmission error code parameter of a downlink channel of second user equipment; and generate an end-to-end voice quality index between the first user equipment and the second user equipment according to the first transmission error code parameter and the second transmission error code parameter. By means of this embodiment, a network node can calculate an end-to-end VQI between different user equipments, so as to assess end-to-end voice quality by using the end-to-end VQI and satisfy a requirement on end-to-end voice quality assessment between the different user equipments.

Figure 2:
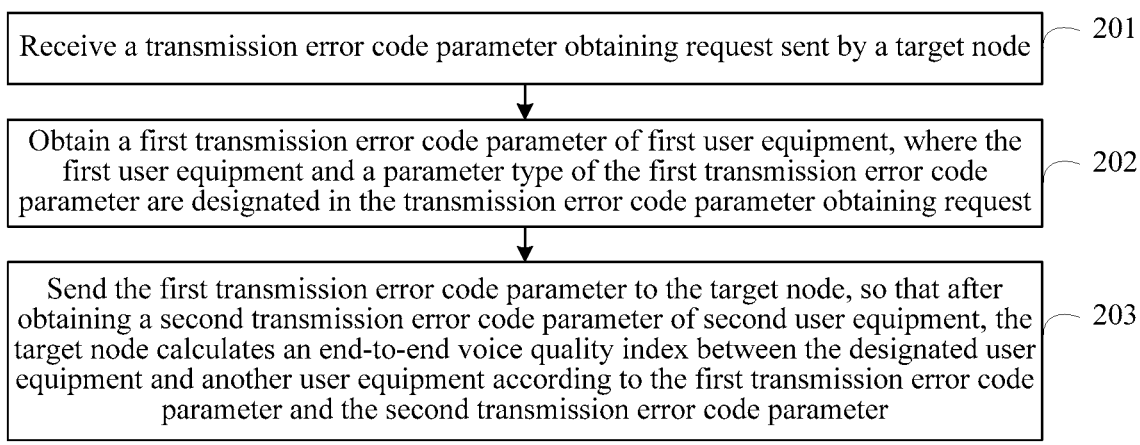
FIG. 2 is a flowchart of another embodiment of a voice quality assessment method according to the present invention.

Referring to FIG. 2, FIG. 2 is a flowchart of another embodiment of a voice quality assessment method according to the present invention. The method described in this embodiment may be performed by an access node in a wireless communications system, such as a BS or an RNC. As shown in the FIG. 2, the method includes the following steps.

Step 201: Receive a transmission error code parameter obtaining request sent by a target node.

The access node first receives the transmission error code parameter obtaining request sent by the target node. The access node may be a network node, such as a BS or an RNC, configured to be accessed by user equipment in a wireless communications system. The target node may be any network node such as a BS, an RNC, or a core network in a wireless communications system.

Step 202: Obtain a first transmission error code parameter of first user equipment, where the first user equipment and a parameter type of the first transmission error code parameter are designated in the transmission error code parameter obtaining request.

After obtaining the transmission error code parameter obtaining request, the access node may determine, according to the transmission error code parameter obtaining request, the first user equipment in multiple user equipments that access the access node, and determine a parameter type of a transmission error code parameter (that is, the first transmission error code parameter) that the target node intends to obtain. After both the first user equipment and the parameter type are determined, the target node may obtain the first transmission error code parameter of the first user equipment. The first transmission error code parameter may be a transmission error code parameter of an uplink channel, or may be a transmission error code parameter of a downlink channel.

For example, when the transmission error code parameter obtaining request carries an international mobile equipment identity (IMEI) and a parameter type indication, the access node may determine the first user equipment according to the IMEI, determine the parameter type of the first transmission error code parameter according to the parameter type indication, and after both the first user equipment and the parameter type are determined, obtain the first transmission error code parameter of the first user equipment. When the transmission error code parameter obtaining request carries only the IMEI, the access node may determine the first user equipment according to the IMEI, consider the parameter type of the first transmission error code parameter as a default parameter type that is preset in a system, and after the first user equipment is determined, obtain a first transmission error code parameter of the pre-determined type.

Step 203: Send the first transmission error code parameter to the target node, so that after obtaining a second transmission error code parameter of second user equipment, the target node calculates an end-to-end voice quality index between the designated user equipment and another user equipment according to the first transmission error code parameter and the second transmission error code parameter.

After obtaining the first transmission error code parameter, the access node may send the first transmission error code parameter to the target node. After obtaining the second transmission error code parameter, the target node may calculate the end-to-end voice quality index between the designated user equipment and the another user equipment according to the first transmission error code parameter and the second transmission error code parameter. When the first transmission error code parameter is a transmission error code parameter of an uplink channel of the first user equipment, the second transmission error code parameter is a transmission error code parameter of a downlink channel of the second user equipment. When the first transmission error code parameter is a transmission error code parameter of a downlink channel of the first user equipment, the second transmission error code parameter is a transmission error code parameter of an uplink channel of the second user equipment.

An obtaining manner of the second transmission error code parameter is similar to that of the first transmission error code parameter, and details are not described herein again. For a specific calculation manner of the end-to-end voice quality index, refer to the foregoing embodiments, and details are not described herein again.

In this embodiment, a transmission error code parameter obtaining request sent by a target node is received; a first transmission error code parameter of first user equipment is obtained, where the first user equipment and a parameter type of the first transmission error code parameter are designated in the transmission error code parameter obtaining request; and the first transmission error code parameter is sent to the target node, so that after obtaining a second transmission error code parameter of second user equipment, the target node calculates an end-to-end voice quality index between the designated user equipment and another user equipment according to the first transmission error code parameter and the second transmission error code parameter. By means of this embodiment, an access node may provide a transmission error code parameter of user equipment for a target node, so that the target node can calculate an end-to-end voice quality index between user equipments.

Corresponding to the voice quality assessment method in the present invention, the present invention further provides a voice quality assessment apparatus.

Figure 3:
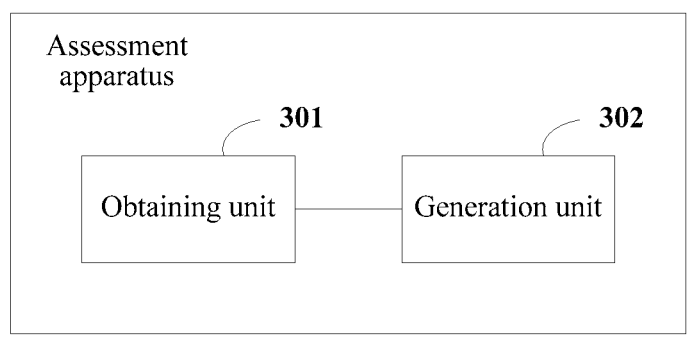
FIG. 3 is a schematic structural diagram of an embodiment of a voice quality assessment apparatus according to the present invention.

Referring to FIG. 3, FIG. 3 is a schematic structural diagram of an embodiment of a voice quality assessment apparatus according to the present invention. The apparatus may be disposed on a network node and configured to perform the voice quality assessment method in the embodiment corresponding to FIG. 1.

As shown in FIG. 3, the apparatus includes an obtaining unit 301 and a generation unit 302.

The obtaining unit 301 is configured to obtain a first transmission error code parameter and a second transmission error code parameter, where the first transmission error code parameter is a transmission error code parameter of an uplink channel of first user equipment, and the second transmission error code parameter is a transmission error code parameter of a downlink channel of second user equipment; and the generation unit 302 is configured to generate an end-to-end voice quality index between the first user equipment and the second user equipment according to the first transmission error code parameter and the second transmission error code parameter.

Optionally, the obtaining unit 301 may include: an access node determining subunit, configured to determine a first access node accessed by the first user equipment and a second access node accessed by the second user equipment; a first parameter obtaining subunit, configured to obtain the first transmission error code parameter from the first access node; and a second parameter obtaining subunit, configured to obtain the second transmission error code parameter from the second access node.

Optionally, the generation unit 302 may include: a parameter generation subunit, configured to: when both a parameter type of the first transmission error code parameter and a parameter type of the second transmission error code parameter are pre-determined types, generate an end-to-end transmission error code parameter between the first user equipment and the second user equipment according to the first transmission error code parameter and the second transmission error code parameter; and a first index calculation subunit, configured to calculate the end-to-end voice quality index corresponding to the end-to-end error code parameter by using a preset voice quality index calculation model.

Alternatively, the generation unit 302 may include: a parameter type determining subunit, configured to determine a parameter type of the first transmission error code parameter and a parameter type of the second transmission error code parameter; a calculation model selection subunit, configured to select a current voice quality index calculation model corresponding to the parameter types from a candidate voice quality index calculation model; and a second index calculation subunit, configured to calculate the end-to-end voice quality index corresponding to the end-to-end error code parameter by using the current voice quality index calculation model.

By means of this embodiment, the voice quality assessment apparatus can calculate an end-to-end VQI between different user equipments, so as to assess end-to-end voice quality by using the end-to-end VQI and satisfy a requirement on end-to-end voice quality assessment between the different user equipments.

Figure 4:
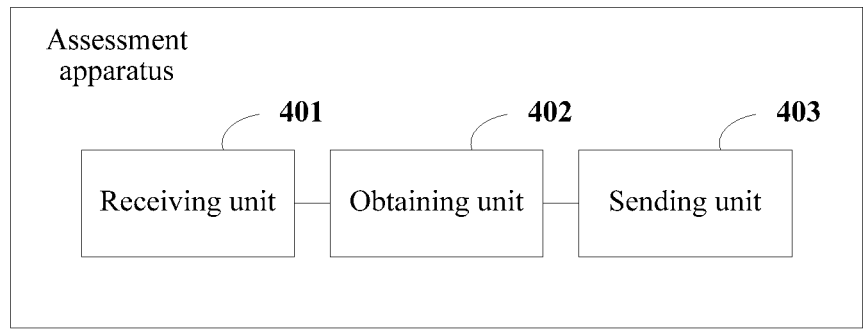
FIG. 4 is a schematic structural diagram of another embodiment of a voice quality assessment apparatus according to the present invention.

Referring to FIG. 4, FIG. 4 is a schematic structural diagram of another embodiment of a voice quality assessment apparatus according to the present invention. The apparatus may be disposed on an access node and configured to perform the voice quality assessment method in the embodiment corresponding to FIG. 2.

As shown in FIG. 4, the apparatus may include: a receiving unit 401, an obtaining unit 402, and a sending unit 403.

The receiving unit 401 is configured to receive a transmission error code parameter obtaining request sent by a target node; the obtaining unit 402 is configured to obtain a first transmission error code parameter of first user equipment, where the first user equipment and a parameter type of the first transmission error code parameter are designated in the transmission error code parameter obtaining request; and the sending unit 403 is configured to send the first transmission error code parameter to the target node, so that after obtaining a second transmission error code parameter of second user equipment, the target node calculates an end-to-end voice quality index between the designated user equipment and another user equipment according to the first transmission error code parameter and the second transmission error code parameter.

When the first transmission error code parameter is a transmission error code parameter of an uplink channel of the first user equipment, the second transmission error code parameter may be a transmission error code parameter of a downlink channel of the second user equipment. When the first transmission error code parameter is a transmission error code parameter of a downlink channel of the first user equipment, the second transmission error code parameter may be a transmission error code parameter of an uplink channel of the second user equipment.

By means of this embodiment, the voice quality assessment apparatus may provide a transmission error code parameter of user equipment for a target node, so that the target node can calculate an end-to-end voice quality index between user equipments.

Figure 5:
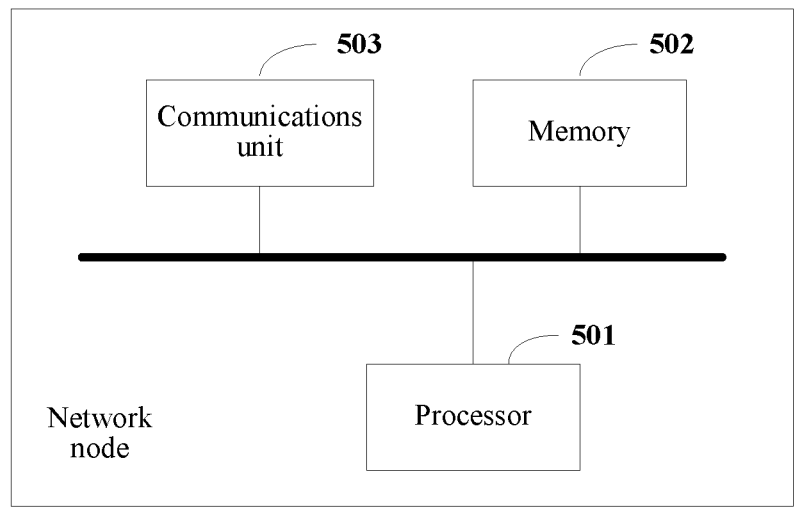
FIG. 5 is a schematic structural diagram of an embodiment of a network node according to the present invention.

Referring to FIG. 5, FIG. 5 is a schematic structural diagram of an embodiment of a network node according to the present invention. The network node may be a base station, a radio network controller, or a core network and is configured to perform the voice quality assessment method in the embodiment corresponding to FIG. 1.

As shown in FIG. 5, the network node may include: a processor 501, a memory 502, and a communications unit 503. The components communicate with each other by using one or more buses. A person skilled in the art may understand that a structure of the network node shown in the figure does not constitute a limitation to the present invention. The network node may be of a structure of a bus or a star, and may further include more or less components than those shown in the figure, or combine some components, or include different component layouts.

The processor 501 is a control center of the network node, connects parts of the entire network node by means of various interfaces and circuits, and executes various functions of the network node and/or process data by running or executing a software program and/or a module stored in the memory 502 and invoking data stored in the memory 502.

The processor 501 may include an integrated circuit (IC), for example, may include a single packaged IC, or may include multiple packaged ICs that have a same function or different functions. For example, the processor 501 may include only a central processing unit (CPU) 501, or may be a combination of a GPU, a digital signal processor (DSP) 501, and a control chip (for example, a baseband chip) in the communications unit 503. In an implementation of the present invention, the CPU may be a single operation core, or may include multiple operation cores.

The communications unit 503 is configured to set up a communication channel, so that the network node connects, by using the communication channel, to a terminal or other network nodes for communication. For example, the network node may receive a message sent by the terminal, or may return a response message to the terminal or send, to the terminal, data corresponding to a message sent by the terminal. This is not specifically limited in this embodiment of the present invention.

The memory 502 may be configured to store a software program and a module. The processor 501 runs the software program and module stored in the memory 502, so as to execute various function applications of the network node and implement data processing.

In this embodiment of the present invention, the communications unit 503 is configured to obtain a first transmission error code parameter and a second transmission error code parameter, where the first transmission error code parameter is a transmission error code parameter of an uplink channel of first user equipment, and the second transmission error code parameter is a transmission error code parameter of a downlink channel of second user equipment; and the processor 501 is configured to generate an end-to-end voice quality index between the first user equipment and the second user equipment according to the first transmission error code parameter and the second transmission error code parameter.

Optionally, the processor 501 may be further configured to determine a first access node accessed by the first user equipment and a second access node accessed by the second user equipment; and the communications unit 503 may be further configured to obtain the first transmission error code parameter from the first access node; and obtain the second transmission error code parameter from the second access node.

Optionally, the processor 501 may be further configured to: when both a parameter type of the first transmission error code parameter and a parameter type of the second transmission error code parameter are pre-determined types, generate an end-to-end transmission error code parameter between the first user equipment and the second user equipment according to the first transmission error code parameter and the second transmission error code parameter; and calculate the end-to-end voice quality index corresponding to the end-to-end error code parameter by using a preset voice quality index calculation model.

Optionally, the processor 501 may be further configured to: determine the parameter type of the first transmission error code parameter and the parameter type of the second transmission error code parameter; select a current voice quality index calculation model corresponding to the parameter types from a candidate voice quality index calculation model; and calculate the end-to-end voice quality index corresponding to the end-to-end error code parameter by using the current voice quality index calculation model.

By means of this embodiment, the network node can calculate an end-to-end VQI between different user equipments, so as to assess end-to-end voice quality by using the end-to-end VQI and satisfy a requirement on end-to-end voice quality assessment between the different user equipments.

Figure 6:
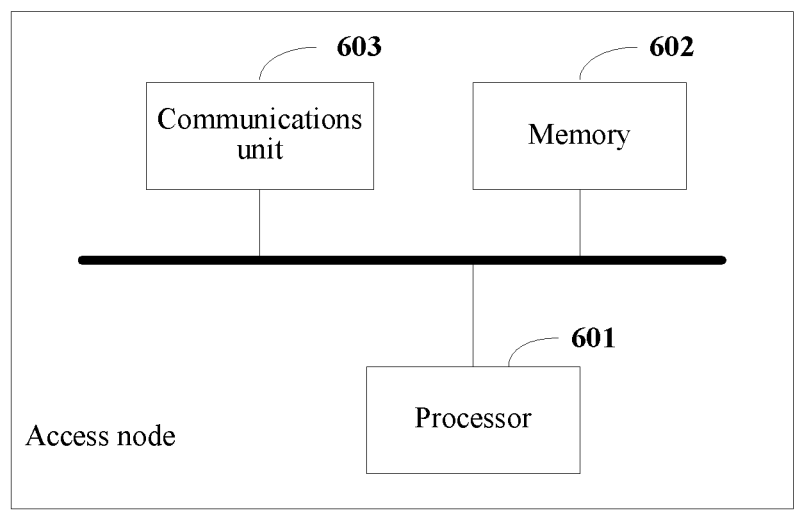
FIG. 6 is a schematic structural diagram of an embodiment of an access node according to the present invention.

FIG. 6 is a schematic structural diagram of an embodiment of an access node according to the present invention. The access node may be a base station or a radio network controller and is configured to perform the voice quality assessment method in the embodiment corresponding to FIG. 2.

As shown in FIG. 6, the access node may include: a processor 601, a memory 602, and a communications unit 603. The components communicate with each other by using one or more buses. A person skilled in the art may understand that a structure of the access node shown in the figure does not constitute a limitation to the present invention. The network node may be of a structure of a bus or a star, and may further include more or less components than those shown in the figure, or combine some components, or include different component layouts.

The processor 601 is a control center of the access node, connects parts of the entire access node by means of various interfaces and circuits, and executes various functions of the access node and/or process data by running or executing a software program and/or a module stored in the memory 602 and invoking data stored in the memory 602.

The processor 601 may include an integrated circuit, for example, may include a single packaged IC, or may include multiple packaged ICs that have a same function or different functions. For example, the processor 601 may include only a central processing unit 601, or may be a combination of a GPU, a digital signal processor 601, and a control chip (for example, a baseband chip) in the communications unit 603. In an implementation of the present invention, the CPU may be a single operation core, or may include multiple operation cores.

The communications unit 603 is configured to set up a communication channel, so that the access node connects, by using the communication channel, to a terminal or other network nodes for communication. For example, the access node may receive a message sent by the terminal, or may return a response message to the terminal or send, to the terminal, data corresponding to a message sent by the terminal. This is not specifically limited in this embodiment of the present invention.

The memory 602 may be configured to store a software program and a module. The processor 601 runs the software program and module stored in the memory 602, so as to execute various function applications of the access node and implement data processing.

In this embodiment of the present invention, the communications unit 603 is configured to receive a transmission error code parameter obtaining request sent by a target node; the processor 601 is configured to obtain a first transmission error code parameter of first user equipment, where the first user equipment and a parameter type of the first transmission error code parameter are designated in the transmission error code parameter obtaining request; and the communications unit 603 is further configured to send the first transmission error code parameter to the target node, so that after obtaining a second transmission error code parameter of second user equipment, the target node calculates an end-to-end voice quality index between the designated user equipment and another user equipment according to the first transmission error code parameter and the second transmission error code parameter.

By means of this embodiment, the access node may provide a transmission error code parameter of user equipment for a target node, so that the target node can calculate an end-to-end voice quality index between user equipments.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, refer to these embodiments, and each embodiment focuses on a difference from other embodiments. Especially, a system embodiment is basically similar to a method embodiment, and therefore is described briefly; for related parts, refer to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A voice quality assessment method, comprising:
obtaining a transmission error code parameter of an uplink channel of first user equipment for a voice call from a first base station, wherein the first user equipment has accessed the first base station;
obtaining a transmission error code parameter of a downlink channel of second user equipment for the voice call from a second base station, wherein the second user equipment has accessed the second base station; and
generating an end-to-end voice quality index between the first user equipment and the second user equipment according to the transmission error code parameter of the uplink channel of the first user equipment and the transmission error code parameter of the downlink channel of the second user equipment, wherein the end-to-end voice quality index is a sum of the first transmission error code parameter and the second transmission error code parameter or is a sum of a product of the first transmission error code parameter and a first weight value and a product of the second transmission error code parameter and a second weight value.

2. The method according to claim 1, wherein the generating the end-to-end voice quality index between the first user equipment and the second user equipment comprises:
in response to determining that both a first parameter type of the transmission error code parameter of the uplink channel of the first user equipment and a second parameter type of the transmission error code parameter of the downlink channel of the second user equipment are pre-determined types, generating an end-to-end transmission error code parameter between the first user equipment and the second user equipment according to the transmission error code parameter of the uplink channel of the first user equipment and the transmission error code parameter of the downlink channel of the second user equipment; and
calculating the end-to-end voice quality index corresponding to the end-to-end transmission error code parameter by using a preset voice quality index calculation model.

3. The method according to claim 1, wherein the generating the end-to-end voice quality index between the first user equipment and the second user equipment comprises:
determining a first parameter type of the transmission error code parameter of the uplink channel of the first user equipment and a second parameter type of the transmission error code parameter of the downlink channel of the second user equipment;

selecting a current voice quality index calculation model corresponding to the first and the second parameter types from a candidate voice quality index calculation model; and calculating the end-to-end voice quality index corresponding to an end-to-end transmission error code parameter between the first user equipment and the second user equipment by using the current voice quality index calculation model, wherein the end-to-end transmission error code parameter is generated according to the transmission error code parameter of the uplink channel of the first user equipment and the transmission error code parameter of the downlink channel of the second user equipment.

4. A voice quality assessment apparatus, comprising:

a non-transitory memory storage comprising instructions; and one or more hardware processors in communication with the memory storage, wherein the one or more hardware processors execute the instructions to:

obtain a transmission error code parameter of an uplink channel of first user equipment for a voice call from a first base station, wherein the first user equipment has accessed the first base station;

obtain a transmission error code parameter of a downlink channel of second user equipment for the voice call from a second base station, wherein the second user equipment has accessed the second base station; and generate an end-to-end voice quality index between the first user equipment and the second user equipment according to the transmission error code parameter of the uplink channel of the first user equipment and the transmission error code parameter of the downlink channel of the second user equipment, wherein the end-to-end voice quality index is a sum of the first transmission error code parameter and the second transmission error code parameter or is a sum of a product of the first transmission error code parameter and a first weight value and a product of the second transmission error code parameter and a second weight value.

5. The apparatus according to claim 4, wherein the one or more hardware processors further execute the instructions to:

in response to determining that both a first parameter type of the transmission error code parameter of the uplink channel of the first user equipment and a second parameter type of the transmission error code parameter of the downlink channel of the second user equipment are pre-determined types, generate an end-to-end transmission error code parameter between the first user equipment and the second user equipment according to the transmission error code parameter of the uplink channel of the first user equipment and the transmission error code parameter of the downlink channel of the second user equipment; and calculate the end-to-end voice quality index corresponding to the end-to-end transmission error code parameter by using a preset voice quality index calculation model.

6. The apparatus according to claim 4, wherein the one or more hardware processors further execute the instructions to:

determine a first parameter type of the transmission error code parameter of the uplink channel of the first user equipment and a second parameter type of the transmission error code parameter of the downlink channel of the second user equipment;

select a current voice quality index calculation model corresponding to the first and the second parameter types from a candidate voice quality index calculation model; and calculate the end-to-end voice quality index corresponding to an end-to-end transmission error code parameter by using the current voice quality index calculation model, wherein the end-to-end transmission error code parameter is generated according to the transmission error code parameter of the uplink channel of the first user equipment and the transmission error code parameter of the downlink channel of the second user equipment.

7. A non-transitory computer-readable medium storing computer instructions for voice quality assessment in a communication network, that when executed by one or more hardware processors, cause the one or more hardware processors of a router to perform operations comprising:

obtaining a transmission error code parameter of an uplink channel of first user equipment for a voice call from a first base station, wherein the first user equipment has accessed the first base station;

obtaining a transmission error code parameter of a downlink channel of second user equipment for the voice call from a second base station, wherein the second user equipment has accessed the second base station; and generating an end-to-end voice quality index between the first user equipment and the second user equipment according the transmission error code parameter of the uplink channel of the first user equipment and the transmission error code parameter of the downlink channel of the second user equipment, wherein the end-to-end voice quality index is a sum of the first transmission error code parameter and the second transmission error code parameter or is a sum of a product of the first transmission error code parameter and a first weight value and a product of the second transmission error code parameter and a second weight value.

8. The non-transitory computer-readable medium according to claim 7, wherein the generating the end-to-end voice quality index between the first user equipment and the second user equipment comprises:

in response to determining that both a first parameter type of the transmission error code parameter of the uplink channel of the first user equipment and a second parameter type of the transmission error code parameter of the downlink channel of the second user equipment are pre-determined types, generating an end-to-end transmission error code parameter between the first user equipment and the second user equipment according to the transmission error code parameter of the uplink channel of the first user equipment and a second parameter type of the transmission error code parameter of the downlink channel of the second user equipment; and calculating the end-to-end voice quality index corresponding to the end-to-end transmission error code parameter by using a preset voice quality index calculation model.

9. The non-transitory computer-readable medium according to claim 7, wherein the generating the end-to-end voice quality index between the first user equipment and the second user equipment comprises:

determining a first parameter type of the transmission error code parameter of the uplink channel of the first user equipment and a second parameter type of the transmission error code parameter of the downlink channel of the second user equipment;

selecting a current voice quality index calculation model corresponding to the first and the second parameter types from a candidate voice quality index calculation model; and calculating the end-to-end voice quality index corresponding to an end-to-end transmission error code parameter between the first user equipment and the second user equipment by using the current voice quality index calculation model, wherein the end-to-end transmission error code parameter is generated according to the transmission error code parameter of the uplink channel of the first user equipment and a second parameter type of the transmission error code parameter of the downlink channel of the second user equipment.

\* \* \* \* \*